United States Patent
Miyazaki et al.

[11] Patent Number: 5,854,451
[45] Date of Patent: Dec. 29, 1998

[54] PRESSURE SENSITIVE RESISTOR CELL

[75] Inventors: Minekazu Miyazaki; Noriyuki Nakanishi, both of Tokyo, Japan

[73] Assignee: SMK Corporation, Tokyo, Japan

[21] Appl. No.: 597,216

[22] Filed: Feb. 6, 1996

[30] Foreign Application Priority Data

Mar. 16, 1995 [JP] Japan .................................... 7-083465

[51] Int. Cl.[6] .............................. G08C 21/00; G09G 5/00
[52] U.S. Cl. ................................... 178/18.05; 178/18.01; 178/18.03; 345/173; 345/174
[58] Field of Search ..................... 345/173, 174, 345/211, 214; 395/750; 178/18.01, 18.03, 18.05, 19.04, 20.01

[56] References Cited

U.S. PATENT DOCUMENTS

| | | | |
|---|---|---|---|
| 4,821,029 | 4/1989 | Logan et al. | 345/173 |
| 5,313,051 | 5/1994 | Brigida et al. | 345/173 |
| 5,451,724 | 9/1995 | Nakazawa et al. | 178/18 |
| 5,453,941 | 9/1995 | Yoshikawa | 364/558 |
| 5,455,574 | 10/1995 | Itaya et al. | 178/18 |
| 5,518,078 | 5/1996 | Tsujioka et al. | 178/18 |

FOREIGN PATENT DOCUMENTS

| | | |
|---|---|---|
| 6-309086 | 11/1994 | Japan . |
| 6-309087 | 11/1994 | Japan . |

*Primary Examiner*—Vijay Shankar
*Attorney, Agent, or Firm*—Rabin & Champagne, P.C.

[57] ABSTRACT

A simple-structured pressure sensitive resistor cell which is free from the influence of contact resistance when performing coordinate detection, and which permits reduction of power consumption. In a waiting state, a logic circuit makes a primary detection that a resistor plate is being pressed, and then an A/D converter is started. When the contact resistance becomes negligibly small, a secondary detection of the stylus pressure is made by the A/D converter. The A/D converter is held OFF while the cell is in the waiting state, so that power consumption is reduced, and the waiting state can be changed to a coordinate detecting mode after the contact resistance becomes so low as not to affect the coordinate detection.

7 Claims, 9 Drawing Sheets

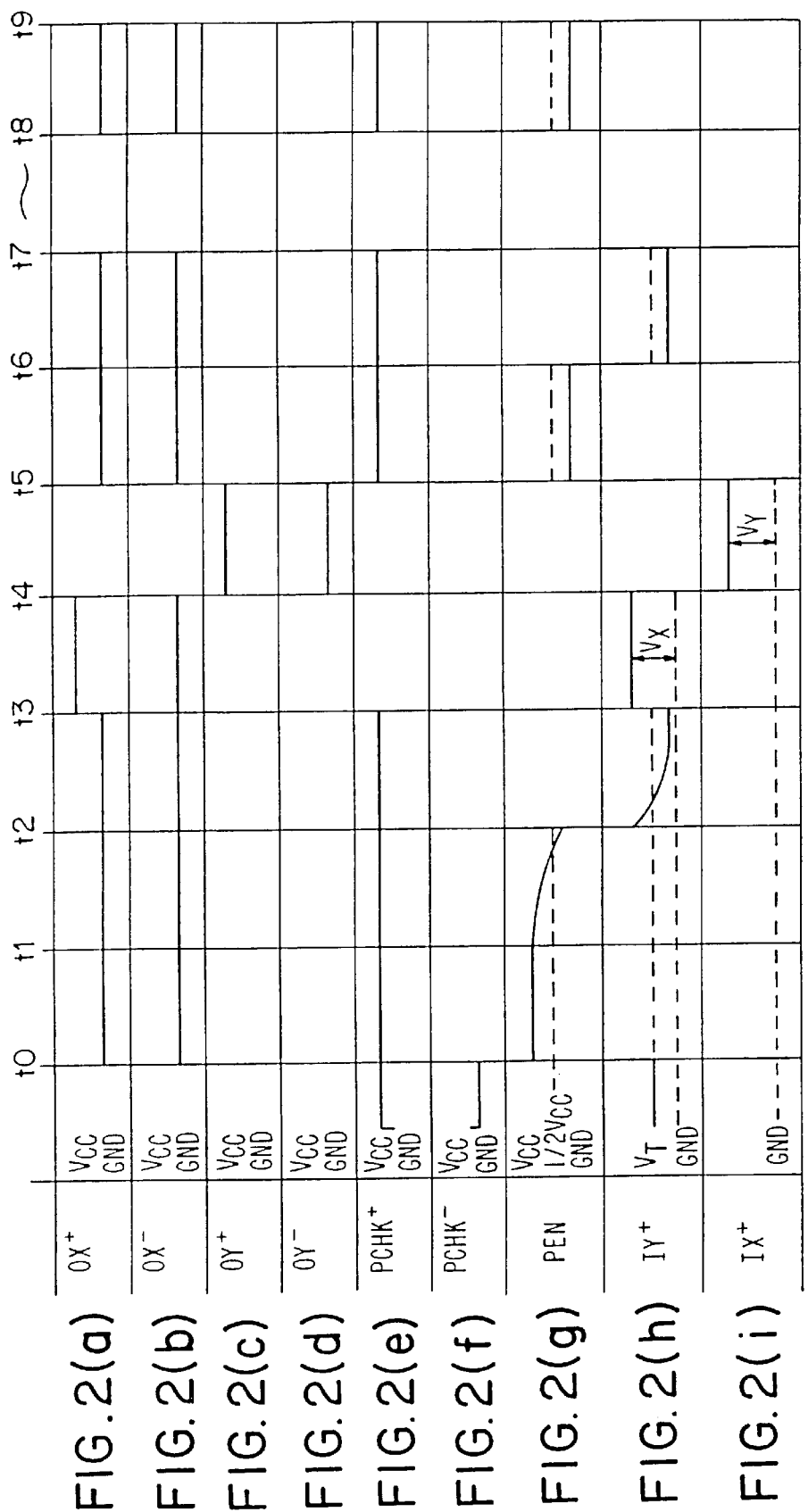

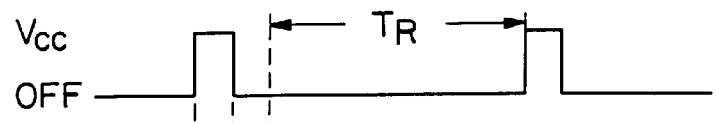
FIG. 3(a) OX+
FIG. 3(b) OY+
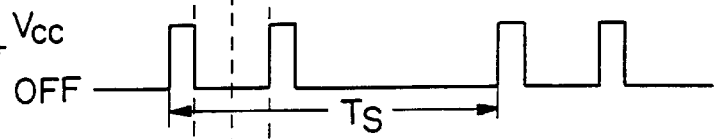
FIG. 3(c) PCHK+
FIG. 3(d)
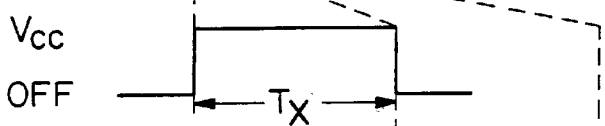
FIG. 3(e) OX+
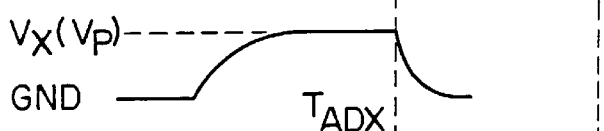
FIG. 3(f) IY+
FIG. 3(g)
FIG. 3(h) OY+
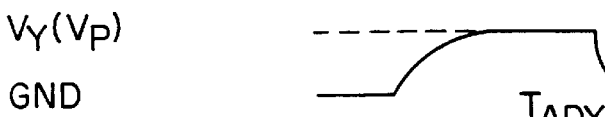
FIG. 3(i) IX+
FIG. 3(j)

PRESSURE SENSITIVE RESISTOR CELL

CROSS-REFERENCE TO RELATED APPLICATIONS

This application is based upon and claims priority from Japanese Patent Application No. 7-83465 filed Mar. 16, 1995, the entire content of which is hereby incorporated herein by reference.

BACKGROUND OF THE INVENTION

1. Field of the Invention

The invention relates to a pressure sensitive resistor cell which detects the position where a stylus, finger, or the like is pressed thereagainst. More particularly, the invention is directed to a pressure sensitive resistor cell which detects the stylus pressure applied thereto by comparison between a voltage variation caused by the stylus pressure applied thereto and a stylus pressure detecting threshold value and then applies a potential to one of two opposed resistor plates to detect the coordinates of the position of the stylus pressure being applied thereto.

2. Description of the Related Art

In FIG. 7, a conventional pressure sensitive resistor cell is depicted. This resistor cell is of the type having a pair of opposed X- and Y-coordinate resistor plates 101 and 102, which are slightly spaced apart by an insulating spacer or the like (not shown) interposed between plates 101 and 102 with their resistance layers facing one another.

Each of the resistance layers is formed by a uniform or homogeneous resistance layer. Hence, when a coordinate detecting voltage is applied to an electrode at one side of the resistor plate and an electrode at the other side is grounded, a potential is developed everywhere in the resistor plate in proportion to the distance from the electrodes, thereby generating a potential gradient.

The coordinate detection in such a pressure sensitive resistor cell begins with the closure of X-side switches 103 and 104 under control of CPU 105 to generate a potential gradient in X-coordinate resistor plate 101. Switch 107 is connected to an input terminal of A/D converter 106 and is also connected to the electrode side of Y-coordinate resistor plate 102.

When X-coordinate resistor plate 101 is pressed by a stylus or the like at a point P (x, y), the potential $V_P$ at point P becomes $V_{CC} \times x1 \div (x1+x2)$, where x2 is a resistance proportional to the distance from the input electrode and x1 is a resistance proportional to the distance from the ground side electrode. The potential $V_P$ is detected by A/D converter 106 and the converter output is fed to CPU 105, wherein the X coordinate (x) is calculated by a calculating means.

Then, a switching means is actuated to turn OFF X-side switches 103 and 104 and turn ON Y-side switches 108 and 109. In this process, switch 107 is connected to the input terminal of A/D converter 106 and is also connected to the electrode side of X-coordinate resistor plate 101.

Similarly, letting the resistance proportional to the distance from the input side electrode and the resistance proportional to the distance from the ground side electrode be represented by y2 and y1, respectively, the potential $V_P$ at the point P is given by $V_{CC} \times y1 \div (y1+y2)$. The potential $V_P$ is fed via A/D converter 106 to CPU 105 to calculate the Y coordinate (y).

The X coordinate (x) and Y coordinate (y) thus computed are output as XY coordinate detected data via output means of CPU 105.

Since in such a coordinate detecting mode, a potential is always alternately applied to X- and Y-coordinate resistor plates 101 and 102, a large power consumption is inevitable.

To avoid this, the conventional pressure sensitive resistor cell, such as that disclosed in Japanese Pat. Laid-Open No. 309086/94 shown in FIG. 7, has a configuration in which, while in its waiting state, no potential is applied to either resistor plate. However, the detection of stylus pressure is immediately followed by the coordinate detecting mode, in which a potential is applied to one of the resistor plates.

That is, while the cell is in the waiting state, a stylus contact detecting mode setting means holds switch 103 of X-coordinate resistor plate 101 in the ON state and switch 102 in the OFF state to maintain X-coordinate resistor plate 101 at the potential $V_{CC}$. Y-coordinate resistor plate 102 is grounded with switch 108 held OFF and switch 109 held ON.

If switch 107, which is connected to the input terminal of A/D converter 106, is held at the electrode side of X-coordinate resistor plate 102, the potential at the input terminal takes the value $V_{CC}$ previously described.

Now, assuming that X-coordinate resistor plate 101 is pressed by a stylus or the like at point P, a current flows from point P to ground via Y-coordinate resistor plate 102 and switch 109. The potential at electrode 110 of X-coordinate resistor plate 101, that is, the potential at the input terminal of A/D converter 106, drops to a predetermined value. CPU 105 compares this potential with a preset stylus pressure detecting threshold value $V_T$, and, if the potential at the input terminal of A/D converter 106 is lower than the preset stylus pressure, CPU 105 judges that resistor plate 101 is being pressed, and enters the aforementioned coordinate detecting mode.

When CPU 105 has entered the coordinate detecting mode, a coordinate detecting voltage is alternately applied to X- and Y-coordinate resistor plates 101 and 102 for periods T'x and T'y, respectively, as shown in FIGS. 8(a) and 8(b), thereby detecting the X and Y coordinates of point P. The coordinate detecting voltage application periods T'x and T'y are each long enough to perform coordinate detection a plurality of times, and these periods are set independently of the data output period $T_D$ in FIG. 8(d). The periods T'x and T'y are, for example, 1.5 msec, during which coordinate calculation, which consumes about 100 msec each time performed, is performed as many times as possible.

The data output period $T_D$ is set longer than the periods T'x and T'y, for example, 10 msec, and the X and Y coordinate data, calculated regardless of the period $T_D$, are processed to obtain abnormality-free correct data, which is output as coordinate detected data from the output means of CPU 105 for each data output period $T_D$.

Also in the coordinate detection mode, as shown in FIGS. 8(a), (b) and (d), the above-mentioned stylus pressure detecting operation is carried out every period of the coordinate detecting mode so as to detect the disengagement of the stylus from the cell during coordinate detection.

Such a conventional pressure sensitive resistor cell is used in many cases as an input unit for notebook type personal computers of limited battery capacities. Due to the use of such resistor cells with notebook computers, there is a strong demand to minimize the power consumed by a pressure sensitive resistor cell to prolong battery life of notebook computers.

The conventional pressure sensitive resistor cell described above is also equipped with a stylus pressure detecting function, so that while in the cell is in the waiting state no voltage is applied to either resistor plate so as to suppress power consumption. While in the waiting state, however, it is necessary, for detection of stylus pressure, that the potential at the electrode of the X-coordinate resistor plate be always converted by the A/D converter to digital form and compared with the stylus pressure detecting threshold value $V_T$.

The resistance of the A/D converter consumes a large amount of power during its operation. This poses the problem that power consumption cannot be reduced even while the pressure sensitive resistor cell is in the waiting state.

In view of the above, there has been proposed a pressure sensitive resistor cell which employs a transistor in place of the A/D converter to reduce the power consumption during the waiting state. That is, the potential at the electrode of the resistor plate, which varies correspondingly with the stylus pressure applied thereto, is compared with the threshold voltage of the transistor to determine if the stylus is being urged against the cell surface.

As shown in FIG. 9, the threshold voltage $V_{TR}$ of the transistor needs to be set above the minimum value $V_{PL}$ that the potential reaches at the electrode of the resistor plate caused by the stylus pressure, which varies with a contact resistance r (in FIG. 7), with the value $V_{PL}$ being achieved when the contact resistance r is stable. Since the potential $V_{PL}$ changes with the material and thickness of the resistor film forming the resistor plate, the threshold voltage $V_{TR}$ of the transistor may preferably be set at a value appreciably higher than the potential $V_{PL}$.

In the pressure sensitive resistor cell of the type detecting the stylus pressure utilizing a transistor, however, since the contact resistance r does not drop to such an extent so as to be negligibly small as compared with the internal resistance of the A/D converter, such a threshold voltage $V_{TR}$ as depicted in FIG. 9 presents the following problem. In this case, coordinate detection is affected by the contact resistance r when the resistor cell is in the coordinate detecting mode.

Moreover, in such conventional pressure sensitive resistor cells, after the coordinate detecting mode starts, a potential gradient always is developed in either of X- and Y-coordinate resistor plates 101 and 102, except during the stylus pressure detection period ($T'_p$ in FIG. 8(c)). This causes current flow in resistor plates 101 and 102, thus consuming power in large quantities. Such a feature is disadvantageous for use in notebook computers, which seek to maximize battery life.

Carbon has long been used as a resistance material, but in recent years, there are tendencies to use ITO (Indium Tin Oxide) which allows easy formation of a uniform or homogeneous film. However, since ITO is relatively low in resistance, power consumption by the resistor plates increases as compared to carbon resistor plates of the same size. Thus, the use of different materials for the resistance material inevitably worsens the problem of undue power consumption of pressure sensitive resistor cells.

Ordinary pressure sensitive resistor cells are designed not to immediately enter the waiting state upon detection of stylus pressure, taking into account the possibility that the stylus may be temporarily removed. Prior to entering the waiting state after detection of the removal of stylus pressure, the coordinate detecting mode occurs a plurality of times, thus causing current to flow in the resistor plate each time, resulting in high power consumption.

SUMMARY OF THE INVENTION

It is therefore an object of the invention to provide a simple-structure for a pressure sensitive resistor cell, which is free from the influence of contact pressure on coordinate detection and consumes less power than prior art devices.

According to a first embodiment of the invention, the pressure sensitive resistor cell includes a pair of opposed X- and Y-coordinate resistor plates with a slight insulating gap defined between them. An A/D converter has its input terminal connected to an electrode of either one of the X- and Y-coordinator resistor plates. A stylus pressure detecting mode setting means raises the potential of one of the X-and Y-coordinate resistor plates up to a stylus pressure detecting voltage level and lowers the potential of the other resistor plate down to ground level while the cell is in a waiting state. A stylus pressure detecting means judges that the one resistor plate is being pressed, and changes the waiting state to a coordinate detecting mode when the potential at the input terminal of the A/D converter exceeds a stylus pressure detecting threshold value. The stylus pressure detecting means is provided with a logic circuit for comparing the voltage of the electrode having connected thereto the input terminal of the A/D converter with a threshold voltage. When the voltage of the one resistor plate, which is varied by a stylus pressure applied thereto, exceeds the threshold voltage of the logic circuit, the stylus pressure detecting means performs a primary detection to judge that the one resistor plate is being pressed. Also, the stylus pressure detecting means starts the A/D converter, comparing the potential at the input terminal of the A/D converter with the stylus pressure detecting threshold value.

According to a second embodiment of the invention, the first embodiment of the pressure sensitive resistor cell is modified by integrating the A/D converter, the stylus pressure detecting mode setting means, the stylus pressure detecting means, and the logic circuit into a one-chip CPU. While in the waiting state, the cell remains in a sleep mode to maintain all circuits of the CPU inoperative, except the stylus pressure detecting mode setting means and the logic circuit. When the voltage of the one resistor plate exceeds the threshold value of the logic circuit, the cell leaves the sleep mode and starts all the circuits of the CPU.

According to a third embodiment of the invention, the pressure sensitive resistor cell of the first or second embodiment further includes detecting voltage input means for applying a coordinate detecting voltage to a voltage input electrode of one of the two opposed resistor plates and, at the same time, grounding a grounding electrode of the one resistor plate to generate in its surface a potential gradient when the cell is in a coordinate detecting mode. The cell of the third embodiment further includes calculating means into which is input a potential at a pressed point (P) on the one resistor plate via the A/D converter having its input terminal connected to the electrode of the other resistor plate and calculates the coordinates of the pressed point (P) from the potential at that point input via the A/D converter from the other resistor plate. Also included in the third embodiment is a switching means, which switches the pair of resistor plates for the generation of a potential gradient by the detecting voltage input means and for the connection with the input terminal of the A/D converter, respectively, after the calculation of one of the coordinates of the pressed point (P). The third embodiment also includes output means which outputs as XY coordinate detected data, for each period, both X and Y coordinates calculated by the calculating means. Only during the period for calculating the X and Y coordinates in each data output period does the detecting voltage input means alternately apply a coordinate detecting voltage to the resistor plates to generate therein a potential gradient for coordinate detection.

According to a fourth embodiment of the invention, the pressure sensitive resistor cell includes a pair of opposed X- and Y-coordinate plates with a slight insulating gap defined between them. The fourth embodiment further includes a detecting voltage input means, which applies a coordinate detecting voltage to a voltage input electrode of one of the resistor plates and, at the same time, grounds a grounding electrode of the one resistor plate to generate in its surface a potential gradient. An A/D converter has its input terminal connected to an electrode of the other resistor plate and inputs therethrough the potential at a pressed point (P) on the one resistor plate with the potential gradient generated in its surface. Also, the fourth embodiment includes calculating means for calculating the coordinates of the pressed point (P) from the potential at the point input thereinto via the A/D converter. A switching means, after the calculation of one of the coordinates of the pressed point (P), switches the pair of resistor plates so as to generate a potential gradient between the detecting voltage input means and the connection with the input terminal of the A/D converter, respectively. An output means outputs as XY coordinate detected data, for each output period, both X and Y coordinates calculated by the calculating means. Only during the period necessary for calculating both X and Y coordinates in each data output period does the detecting voltage input means alternately apply a coordinate detecting voltage to the resistor plates to generate therein a potential gradient.

According to a fifth embodiment of the invention, either of the third and fourth embodiments is modified as follows. The detecting voltage input means starts the application of the coordinate detecting voltage to the one resistor plate to generate therein a potential gradient in a coordinate detecting period ($T_S$). The period $T_S$ is set equal to or shorter than the data output period ($T_D$). After the calculation of one of the coordinates of the pressed point by the calculating means, the detecting voltage input means applies the coordinate detecting voltage to the other resistor plate via the switching means to generate therein a potential gradient. Once both coordinates of the pressed point are calculated, no coordinate detecting voltage is applied to either of the resistor plates during the coordinate detecting period ($T_S$).

According to another aspect of the invention, while the pressure sensitive resistor cell according to the first embodiment is in the waiting state, the input terminal of the logic circuit remains equipotential with the electrode of either one of the resistor plates. When the resistor plate is pressed, the voltage of the electrode thereof varies, and when the voltage varied by the stylus pressure exceeds the threshold value of the logic circuit, the stylus pressure detecting means makes a primary detection of the resistor plate being pressed. After this, the A/D converter is started and the potential at its input terminal is compared with a stylus pressure detecting threshold value ($V_T$).

The potential at the input terminal of the A/D converter is indicative of the voltage varied by the stylus pressure. When this potential exceeds the stylus pressure detecting threshold value, it is decided that the resistor plate is being pressed. Then, the cell leaves the waiting state and goes into the coordinate detecting mode in which to start detection of the XY coordinates of the pressed point. Thus, while the cell is in the waiting state, the A/D converter stays in the OFF state and therefore does not consume power until the primary detection of stylus pressure is made.

Further since the stylus pressure detecting threshold value ($V_T$) can be set close to the minimum potential ($V_{PL}$), which is provided when the contact resistance (r) drops to a negligibly small value, the coordinate detection is free from the influence of the contact resistance by the stylus after the cell changes to the coordinate detecting mode.

According to another aspect of the second embodiment of the invention, while the pressure sensitive resistor cell is in the waiting state, all the circuits integrated into the CPU, except the stylus pressure detecting mode setting means and the logic circuit, are held OFF. Consequently, unnecessary power dissipation can be avoided.

According to another aspect of the third embodiment of the invention, after the pressure sensitive resistor cell enters the coordinate detecting mode, a potential gradient is generated by the detecting voltage input means in one of the resistor plates. The potential at the pressed point (P) on the resistor plate supplied with the detecting voltage is input via the other resistor plate and the A/D converter into the coordinate calculating means to calculate one of the coordinates of the pressed point (P).

Following the detection of the one coordinate of the pressed point (P), a potential gradient is provided via the switching means in the other resistor plate and the other coordinate is similarly calculated. The thus calculated coordinates of the pressed point (P) are output as XY coordinate detected data from the output means every fixed period ($T_D$).

The detecting voltage input means applies the coordinate detecting voltage to either resistor plate corresponding to the coordinate intended to be detected, only for the period necessary for calculating both X and Y coordinates in each data output period ($T_D$).

Once the cell according to the third embodiment of the invention changes to the coordinate detecting mode, coordinate detection is not affected by the contact resistance. Therefore, a limited number of coordinate calculations needs only to be performed in the data output period.

Accordingly, after the X and Y coordinates are detected by performing coordinate calculation a predetermined number of times in the data output period, no potential gradient is produced in either resistor plate, and hence no power is dissipated by the resistor plates during this rest period ($T_R$).

According to a further aspect of the pressure sensitive resistor cell of the fourth embodiment of the invention, a potential gradient is generated by the detecting voltage input means in one of the resistor plates. The potential at the pressed point (P) on the resistor plate supplied with the detecting voltage is input via the other resistor plate and the A/D converter into the calculating means to calculate one of the coordinates of the pressed point (P). After the calculation of the one coordinate, a potential gradient is generated via the switching means and the other coordinate of the pressed point (P) is similarly calculated. The coordinates thus detected are output as XY coordinate detected data from the output means every fixed period.

The detecting voltage input means applies the coordinate detecting voltage to either resistor plate corresponding to the coordinate intended to be detected only for that period of time that is necessary for the detection of the X and Y coordinates in the data output period ($T_D$). Thus, once the X and Y coordinates are detected in the data output period ($T_D$), no potential gradient is produced in either resistor plate and hence no power is consumed by the resistor plates during this rest time ($T_R$).

According to a further feature of the pressure sensitive resistor cell of the fifth embodiment of the invention, upon each commencement of the coordinate detecting period ($T_S$), the detecting voltage input means starts the application of the coordinate detecting voltage to one of the resistor plates to form therein a potential gradient. After the calculation of one of the X and Y coordinates of the pressed point by the calculating means, the detecting voltage input means applies the coordinate detecting voltage via the switching means to the other resistor plate to form therein a potential gradient. Once the X and Y coordinates of the pressed point are calculated in the coordinate detecting period ($T_S$), no coordinate detecting voltage is applied to either resistor plate, and hence no power is dissipated by the resistor plates.

BRIEF DESCRIPTION OF THE DRAWINGS

These and other objects, features, and characteristics of the invention, as well as the economies of manufacture and methods of operation, will become apparent to one skilled in the art by a study of the following detailed description, the appended claims and drawings, all of which form a part of this specification. In the drawings:

FIGS. 2(a)–2(i) are waveform diagrams that explain the pressure sensitive resistor cell of FIG. 1;

FIGS. 3(a)–3(j) are timing charts that explain the operation of the pressure sensitive resistor cell of FIG. 1;

DETAILED DESCRIPTION OF THE PRESENTLY PREFERRED EXEMPLARY EMBODIMENTS

Figure 1:
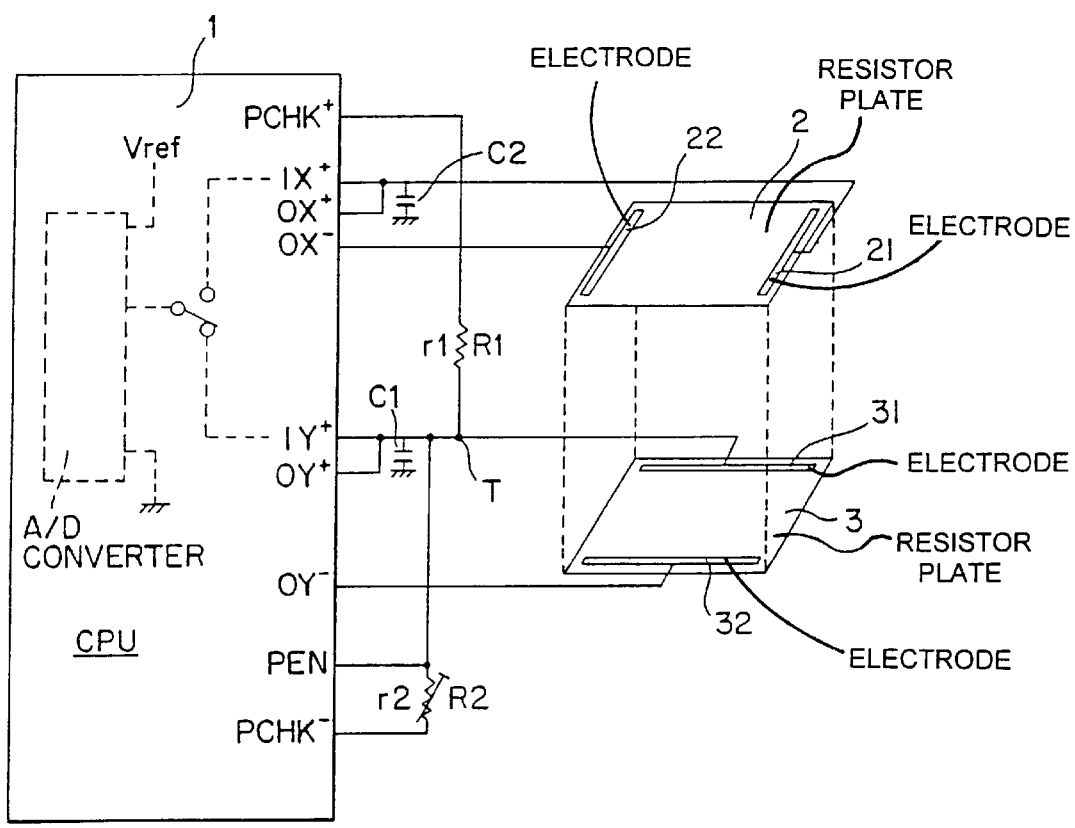
FIG. 1 is a circuit diagram of the pressure sensitive resistor cell according to the invention.
Figure 4:
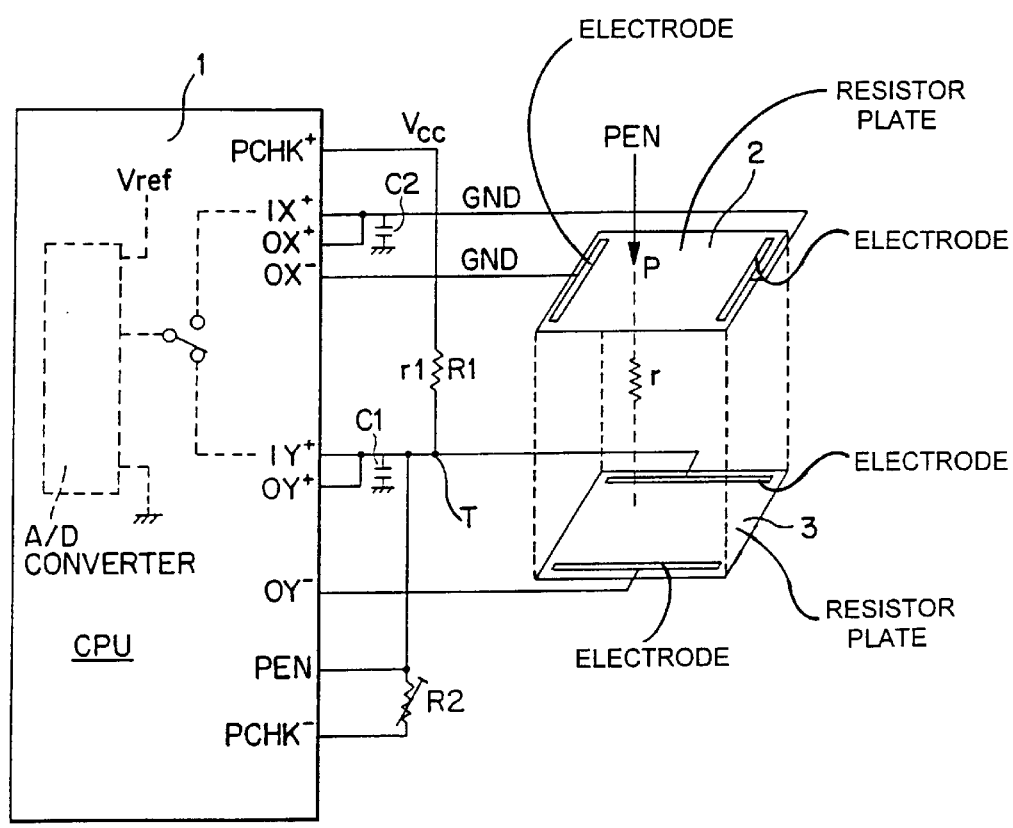
FIG. 4 is a circuit diagram for explaining a stylus pressure detecting mode.

FIG. 1 schematically illustrates an embodiment of the pressure sensitive resistor cell of the invention, in which CPU 1 has a built-in A/D converter, together with its input terminals $IY^+$ and $IX^+$.

The terminal $IX^+$ (FIG. 2(i) and FIG. 3(i)) is connected to voltage input electrode 21 of X-coordinate resistor plate 2, along with terminal $OX^+$. Terminal $OX^-$ of CPU 1 is connected to grounding side terminal 22 of X-coordinate resistor plate 2 to ground it.

Similarly, terminal $IY^+$ is connected to voltage input electrode 31 of Y-coordinate resistor plate 3, along with terminal $OY^+$ (FIG. 2(c)). Terminal $OY^-$ (FIG. 2(d)) of CPU 1 is connected to grounding side electrode 32 of Y-coordinate resistor plate 3 to ground it.

The terminal $IY^+$ is also connected to midtap T between pullup resistor R1 having a 100 KΩ resistance value and adjusting resistor R2, which is a variable resistor whose resistance value varies from 1.5 to 3 KΩ. Pullup resistor R1 is connected at its other end to terminal $PCHK^+$ of CPU 1 for the application of a detecting voltage $V_{CC}$. Adjusting resistor R2 is connected at its other end to terminal $PCHK^-$ for grounding purposes.

Pullup resistor R1 and adjusting resistor R2 constitute a stylus pressure detecting threshold value setting circuit, and the stylus pressure detecting threshold value $V_T$ is set or defined by the voltage dividing ratio between resistors R1 and R2.

Midtap T is also connected to terminal PEN which is an input terminal of a logic circuit of CPU 1 so that it compares, at a CMOS level, a voltage variation by the stylus pressure with a threshold value $V_{TR}$ of the logic circuit before the voltage variation is input via the input terminal of the A/D converter for comparison with the threshold value $V_T$. That is, the logic circuit provided in CPU 1 is a CMOS circuit, and the potential at terminal PEN, which is a gate voltage of the CMOS circuit, is compared with the threshold value $V_T$ at the CMOS level. When the potential at terminal PEN goes down below the threshold value $V_{TR}$ (½ $V_{CC}$) owing to the pressure of a stylus against the cell, the logic circuit makes the primary detection that the cell is being pressed.

It is also possible to form the logic circuit by a logic gate such as TTL (Transistor Transistor Logic) or RTL (Resistor Transistor Logic) and compare the potential at terminal PEN with the threshold value $V_{TR}$. CPU 1 further comprises stylus pressure detecting mode setting means, stylus pressure detecting means, detecting voltage input or supply means, calculating means and output means, which control the input/output at each terminal of CPU 1 and the switching of the input terminals of the A/D converter as shown in FIGS. 2(A)–2(i).

A description is provided with reference to FIGS. 2(a)–2(i), of the operation of the pressure sensitive resistor cell constructed as described above. At first, a stylus pressure detecting threshold value is initialized. As depicted in FIGS. 2(e) and 2(f), a detecting voltage is applied to one end of pullup resistor R1 with the potential at terminal $PCHK^+$ held at $V_{CC}$, and the other end of adjusting resistor R2 is grounded as is terminal $PCHK^-$, both at level GND.

At this time, the potential at midtap T is dependent on the voltage dividing ratio between pullup resistor R1 and adjusting resistor R2. Letting the resistance values of the resistors R1 and R2 be represented by r1 and r2, respectively, the potential at the midtap T is given by $V_{CC} \times r2 \div (r1+r2)$.

This voltage at midtap T is input via the input terminal $IY^+$ into the A/D converter, by which the data is converted to 10-bit digital data, which is the same number of bits as in the A/D converter. CPU 1 stores the digital data as the stylus pressure detecting threshold value $V_T$ in a RAM (not shown). Such a sequence of steps for setting the stylus pressure detecting threshold value are performed each time CPU 1 is turned ON or receives a reset signal from the outside.

When the thus set stylus pressure detecting threshold value $V_T$ is inappropriate for the reason such as "no stylus pressure is detected" or "the coordinate detection is affected by variations in the contact resistance," the threshold value $V_T$ can be reset by changing the resistance value of variable adjusting resistor R2 and turning ON or resetting CPU 1. That is, the voltage at midtap T varies with variation in the resistance of adjusting resistor R2 and, by the same processing as mentioned above, a new threshold value $V_T$ is stored in the aforementioned RAM.

In this way, the stylus pressure detecting threshold value $V_T$ can be set close to the minimum potential $V_{PL}$ to which the voltage at midtap T drops when the contact resistance r becomes stabilized.

At time t0 when the initialization of the stylus pressure detecting threshold value is completed, the cell, including CPU 1, enters the waiting state in which to monitor a stylus pressure input. While in this waiting state, CPU 1 is in a sleep mode in which principal circuits of CPU 1, except the stylus pressure detecting mode setting means and the logic circuit forming the stylus pressure detecting means, are all in the OFF state. The stylus pressure detecting mode setting means and the logic circuit are ON.

In this state, the stylus pressure detecting mode setting means of CPU 1 holds terminal PCHK$^+$ (FIG. 2(e)) at the potential $V_{CC}$, terminal PCHK$^-$ (FIG. 2(f)) in the OFF state (high impedance) and Y-coordinate resistor plate 3, midtap T and terminal PEN (FIG. 2(g)) at the potential $V_{CC}$. Consequently, the potential at terminal PEN, which is the input terminal of the logic circuit of CPU 1, is also $V_{CC}$, that is, equipotential with midtap T.

On the other hand, X-coordinate resistor plate 2 is at ground level since terminals OX$^+$ (FIG. 2(a)) and OX$^-$ (FIG. 2(b)), connected to its electrodes are grounded under the control of the stylus pressure detecting mode setting means. Thus, while the cell is in the waiting state no current flows in the resistor plates and any other circuits of the pressure sensitive resistor cell, and CPU 1 is in the sleep mode in which its principal circuits, including the A/D converter, are in the OFF state. Accordingly, the power dissipation by the entire cell structure is very small.

Figure 5:
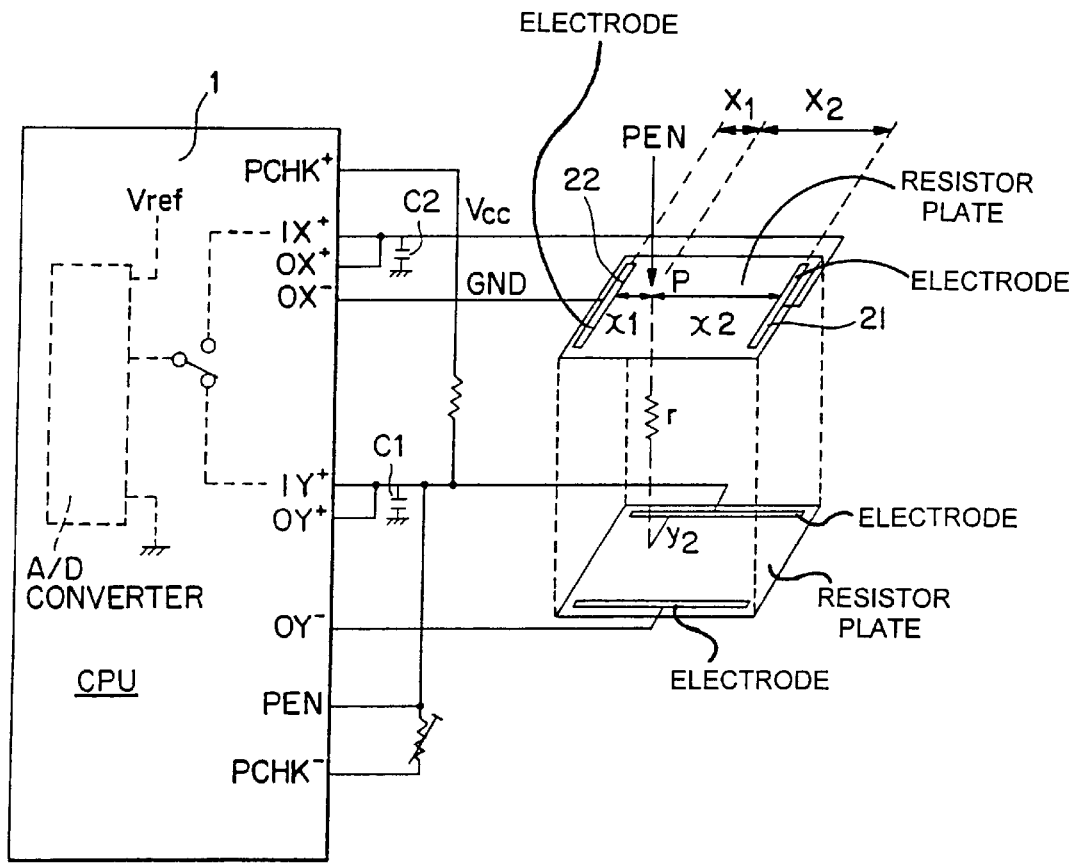
FIG. 5 is a circuit diagram for explaining an X coordinate detecting mode.

Assuming that a stylus is urged against X-coordinate resistor plate 2 at point P as shown in FIG. 5, a current flows from terminal PCHK$^+$ to the terminals OX$^+$ and OX$^-$ via midtap T, Y-coordinate resistor plate 3, point P and X-coordinate resistor plate 2.

In this instance, the potential at terminal PEN is equal to the potential at midtap T and, at the time t1 that X-coordinate resistor plate 2 is being pressed, the potential at terminal PEN begins to drop with a decrease in contact resistance r at point P, as shown in FIG. 2(g).

The resistance value r1 of pullup resistor R1 is set larger than the resistance value of X-coordinate resistor plate 2. Consequently, when contact resistance r drops to some extent, the potential at terminal PEN goes down below ½ $V_{CC}$, which is the threshold value of the logic circuit.

Then, the logic circuit makes the primary detection that X-coordinate resistor plate 2 is being pressed, and CPU 1 leaves the sleep mode at time t2 in FIGS. 2(a)–2(i), starting the A/D converter and all the other circuits in CPU 1. Leaving the sleep mode, CPU 1 enters a secondary stylus pressure detecting mode.

In the secondary stylus pressure detecting mode, since the A/D converter is in the ON state, CPU 1 receives the potential at midtap T via input terminal IY$^+$ of the A/D converter, then converts it into digital form and, at the same time, reads out the stylus pressure detecting threshold value $V_T$ from the RAM for comparison with the midtap potential. When the potential at midtap T goes down below the stylus pressure detecting threshold value $V_T$, the stylus pressure detecting means judges that the resistor plate is being pressed by the stylus.

Upon the detection of the stylus pressure to the cell in the secondary stylus pressure detecting mode, CPU 1 turns OFF terminal PCHK$^+$ and, at time t3, goes into the coordinate detecting mode in which to detect the X and Y coordinates of the point P. At this time, contact resistance r has already become negligibly small as compared with the internal resistance of the A/D converter, and hence the contact resistance does not exert any influence on the coordinate detection in the subsequent coordinate detection mode.

The coordinate detecting mode starts with the application of a voltage to X-coordinate resistor plate 2 to detect the X coordinate of point P. As shown in FIG. 5, the coordinate detecting voltage $V_{CC}$ is applied by the detecting voltage input means to terminal OX$^+$ connected to voltage input side electrode 21 of X-coordinate resistor plate 2 and terminal OX$^-$ connected to the other electrode of X-coordinate resistor plate 2, i.e., ground side electrode 22. In this manner, a potential gradient from the voltage $V_{CC}$ to the ground potential is provided in X-coordinate resistor plate 2. In this instance, the input terminal of the A/D converter is the same as that at input terminal IY$^+$ used in-the-stylus pressure detecting mode.

Figure 6:
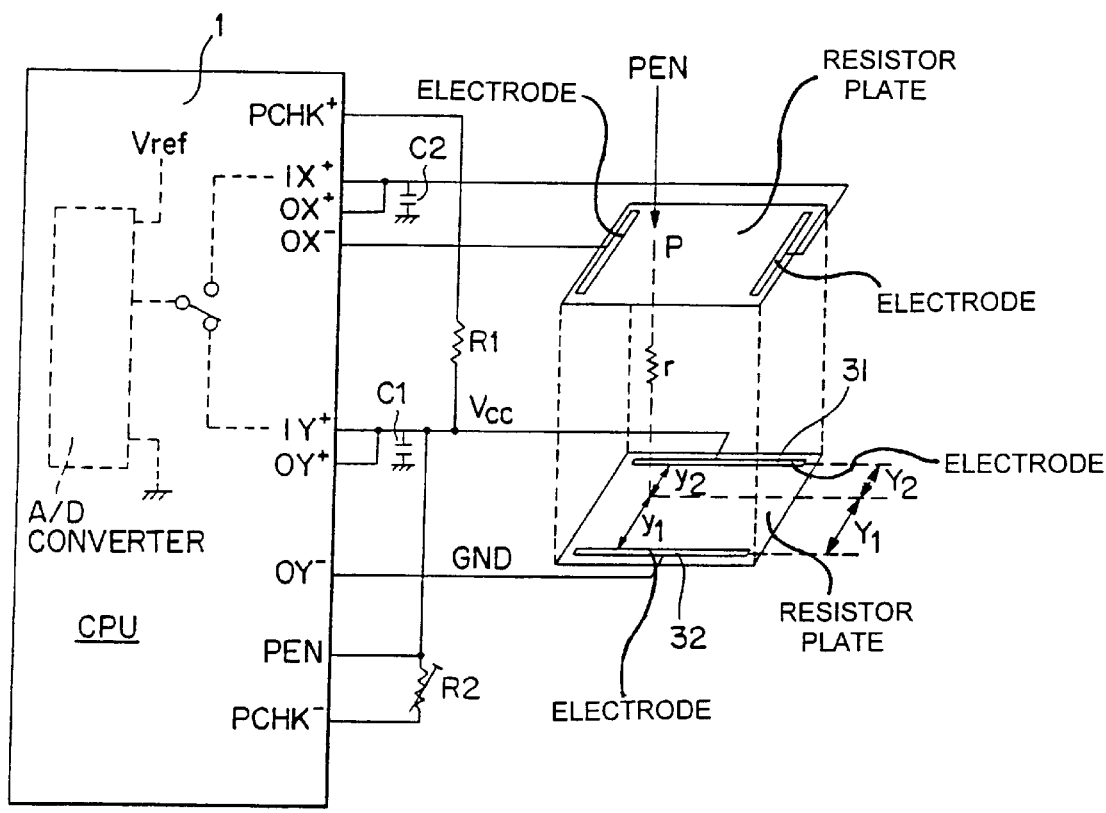
FIG. 6 is a circuit diagram for explaining a Y coordinate detecting mode.
Figure 7:
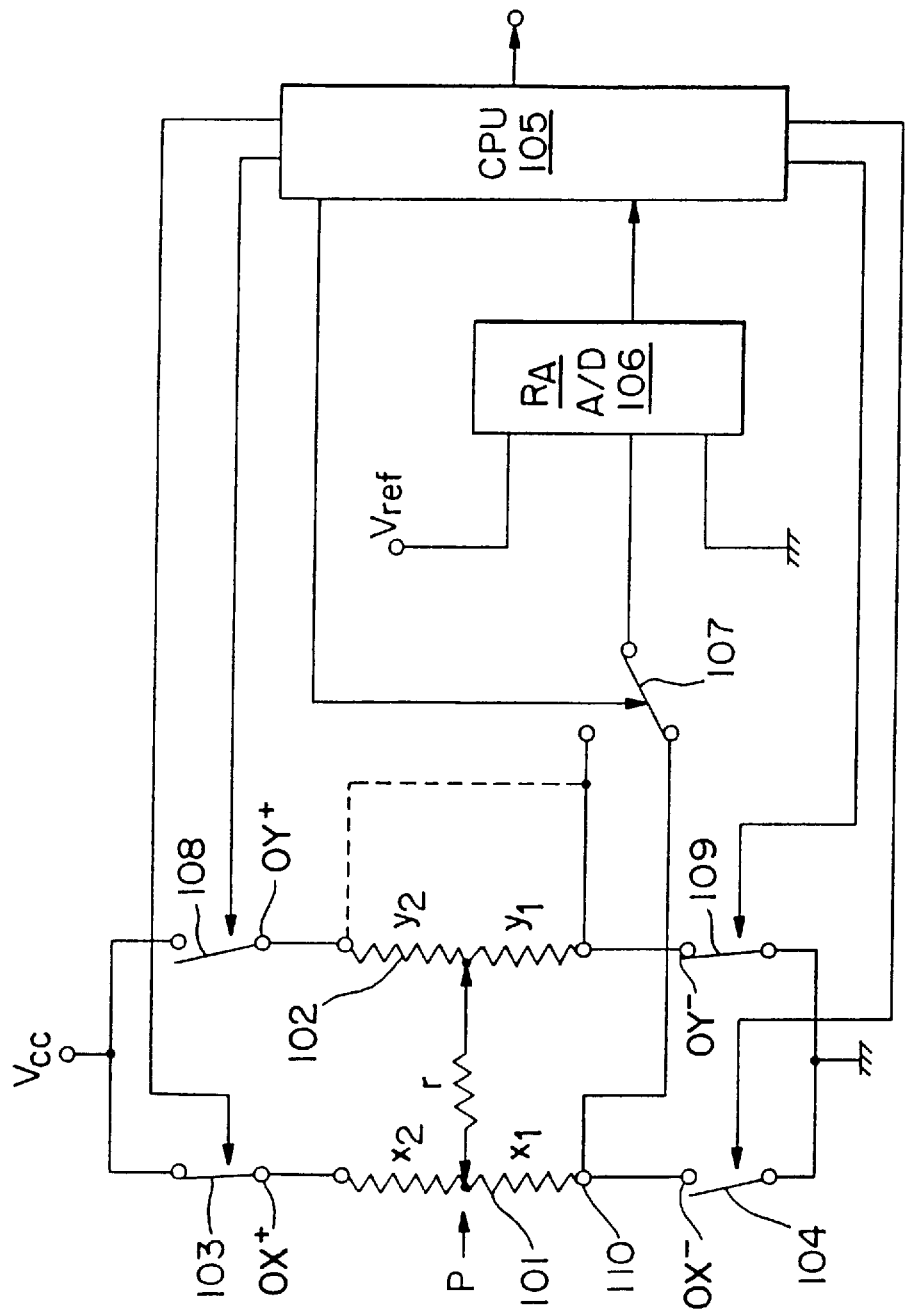
FIG. 7 is a circuit diagram showing a conventional pressure sensitive cell.
Figure 8:
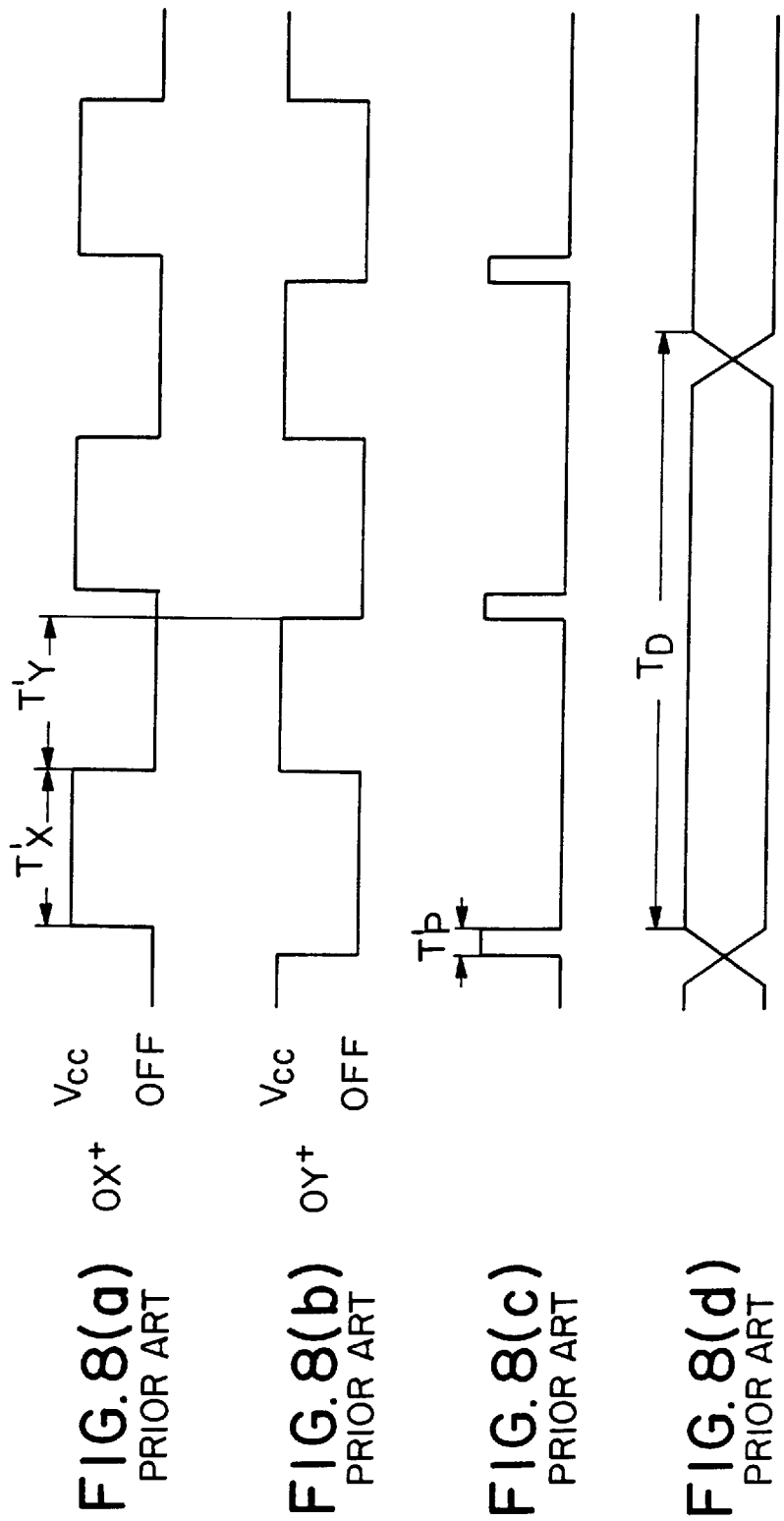
FIGS. 8(a)–8(d) are timing charts for explaining the operation of the conventional pressure sensitive resistor cell.
Figure 9:
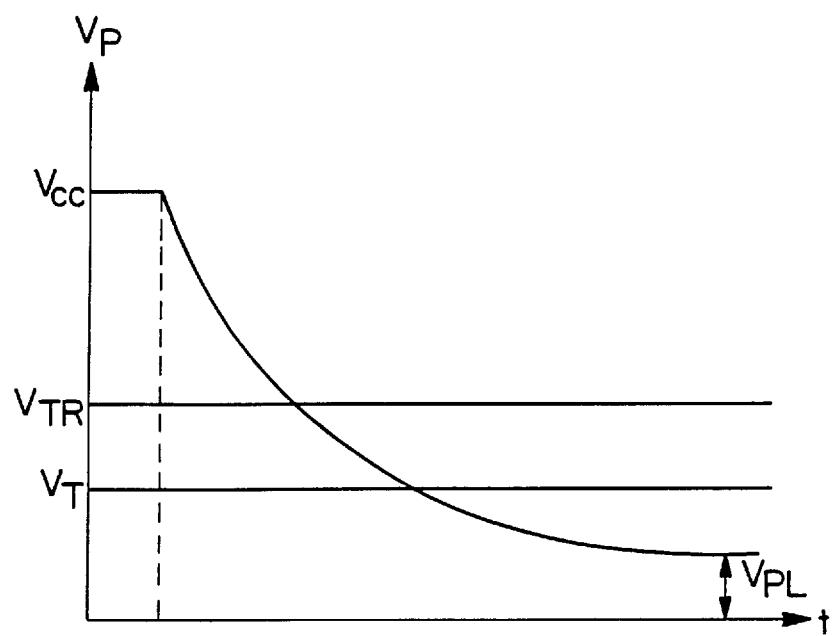
FIG. 9 is a graph showing the relationship between the voltage $V_P$ at a pressed point P which varies by the pressure applied thereto by a stylus, a stylus pressure detecting threshold value $V_T$ and a threshold value $V_{TR}$ in the conventional cell.

FIGS. 3(a)–3(j) are timing charts showing the relationships between the period for which to apply the coordinate detecting voltage $V_{CC}$ to either of resistor plates 2 and 3, the stylus pressure detection timing and the data output timing, and the relationship between the period for which to apply the voltage $V_{CC}$ and the A/D conversion timing. As is evident from FIG. 3(f), the potential at the input terminal IY$^+$ of the A/D converter does not immediately becomes equal to the potential $V_P$ at the pressed point P upon application of the coordinate detecting voltage $V_{CC}$ to the terminal OX$^+$ (FIG. 3(a)). That is, input terminal IY$^+$ of the A/D converter is connected to filter capacitor C1 for high-frequency noise cancellation use as shown in FIG. 6, and input terminal IX$^+$ is connected to filter capacitor C2, and the potential at input terminal IY$^+$ of the A/D converter varies with a time constant t which is determined by approximating it with the product of the capacitance of capacitor C1 and resistance y2 of Y-coordinate resistor plate 3. For example, when the capacitance of capacitor C1 is 1000 pF and the resistance y2 of Y-coordinate resistor plate 3 is 300Ω, the time constant t is 300 nsec.

Accordingly, the potential $V_P$ is input via the A/D converter after the saturation of the potential at its input terminal IY$^+$ that has reached the potential $V_P$.

Letting the voltage dividing resistances at pressed point P be represented by x1 and x2 as shown in FIG. 5, the voltage $V_P$ at the pressed point P is given by $V_{CC} \times x1 \div (x1+x2)$. At this time, contact resistance r has already become negligibly small as compared with internal resistance RA of the A/D converter. Hence, the saturation potential Vx at input terminal IX$^+$ of the A/D converter is substantially equal to the voltage $V_P$ at pressed point P.

Since voltage dividing resistances x1 and x2 are proportional to distances X1 and X2 between point P and electrodes 22 and 21, the X coordinate of point P can be calculated from the voltage $V_P$. Consequently, the calculating means in CPU 1 calculates the X coordinate of point P after the A/D conversion of the potential Vx, which is nearly equal to the voltage $V_P$.

Taking into account the possibility of a conversion error by the A/D converter, the X coordinate is repeatedly calculated from the potential $V_x$, and when the same coordinate continues to be calculated, CPU 1 decides that an effective coordinate has been detected. Then, the application of the coordinate detecting voltage $V_{CC}$ to terminal OX$^+$ is stopped. Thus, the coordinate detecting voltage $V_{CC}$ is applied to terminal OX$^+$ of X-coordinate resistor plate 2 only for the period necessary for coordinate detection.

Assuming that the time for each calculation of the X coordinate is about 100 msec and that the calculation is repeated two to four times, the time $T_{ADX}$ (FIG. 3(g)) for the A/D conversion for the coordinate detection is usually in the range of from 200 to 400 msec. Hence, the period $T_X$ (FIG. 3(e)) for which the coordinate detecting voltage $V_{CC}$ is applied to X-coordinate resistor plate 2 is in the range of 500 to 700 msec, which is the sum of the saturation period of the potential $V_X$ and the A/D conversion period $T_{ADX}$.

As depicted in FIGS. 2(a) and 2(b), after the detection of the effective X coordinate at time t4, terminals OX+ and OX− are turned OFF by the switching means, and at the same time, the A/D converter is connected to terminal IX+ and the Y coordinate of point P is detected. That is, as shown in FIG. 6, the coordinate detecting voltage $V_{CC}$ is applied by the detecting voltage input means to terminal OY+ (FIG. 3(b)) connected to the voltage input side electrode of Y-coordinate resistor plate 3. Terminal OY− is connected to the grounding side electrode of resistor plate 3, by which a potential gradient from the voltage $V_{CC}$ to the ground potential is provided in Y-coordinate resistor plate 3.

Letting the voltage resistances at pressed point P be represented by y1 and y2 as shown, the voltage $V_P$ at pressed point P is $V_{CC} \times y1 \div (y1+y2)$. Since the voltage dividing resistances y1 and y2 are proportional to the distances from point P to electrodes 32 and 31, respectively, the Y coordinate of point P can be calculated from the voltage $V_P$. As is the case with the X coordinate detection, because contact resistance r is negligibly small at this time as compared to internal resistance $R_A$ of the A/D converter and the sum of contact resistance r and internal resistance $R_A$ of the A/D converter is far larger than the resistance value of X-coordinate resistor plate 2, the voltage $V_P$ and the potential $V_Y$ at input terminal IX+ of the A/D converter are substantially equal to each other. Thus, the potential $V_Y$ is converted by the A/D converter to a digital value, from which the Y coordinate of the point P is calculated by the calculating means.

Also in the Y coordinate detection, taking into account the possibility of a conversion error occurring in the A/D converter, the Y coordinate is repeatedly calculated from the potential $V_Y$, and when the same coordinate is obtained by the repeated calculations, it is determined that an effective coordinate has been detected. Therefore, the application of the coordinate detecting voltage $V_{CC}$ to terminal OY+ is stopped. In this manner, the application of the coordinate detecting voltage $V_{CC}$ to terminal OY− of Y-coordinate resistor plate 3 is also limited only to the period necessary for coordinate detection.

In FIG. 3(j), assuming that the period $T_{ADY}$ is also 200 to 400 msec, the period $T_Y$ (FIG. 3(h)) for which the coordinate detecting voltage $V_{CC}$ is applied to Y-coordinate resistor plate 3 is in the range of 500 to 700 msec, which is the sum of potential $V_Y$ saturation period and the period TADY necessary for the A/D conversion. When the coordinate is A/D converted by the A/D converter, the coordinate being calculated as many as eight times successively, does not match the immediately calculated value, the coordinates calculated until then are regarded as invalid, and the application of the coordinate detecting voltage $V_{CC}$ is suspended.

As shown in FIGS. 2(c) and 2(d), upon completion of the effective detection of the X and Y coordinates at time t5, the terminals OY+ and OY− are turned OFF and Y-coordinate resistor plate 3 is set again at the stylus pressure detecting voltage level $V_{CC}$ by the stylus pressure detecting mode setting means of CPU 1. At the same time, X-coordinate resistor plate 2 is set at the ground level, after which the stylus pressure detecting steps from time t1 to t3 are repeated from t5 to t7.

In the stylus pressure detecting period from t5 to t7, when the potential at terminal PEN (FIG. 2(g)) is below ½ $V_{CC}$ and the potential at terminal IY+ (FIG. 2(h)) is also below the stylus pressure detecting threshold value $V_T$, it is determined that the stylus has been pressed against the cell after the coordinate detection. The X and Y coordinates obtained by the immediately preceding calculation are used as XY coordinate detected data.

When no stylus pressure can be detected by either the primary or secondary stylus pressure detection, it is judged that the stylus was removed from the cell in the course of the coordinate detection and X and Y coordinate data obtained by the immediately preceding calculation is rendered invalid. In this instance, the detected X and Y coordinates are not used as X and Y coordinate detected data.

In either case, once the stylus pressure is detected and the coordinate detection is performed accordingly, the stylus pressure detection is restarted at time t8. The stylus pressure detection starting time t8 is set at 10 msec (the coordinate detecting period or cycle ($T_S$) (FIG. 3(c))) after the first primary detection of the stylus pressure by the logic circuit and the departure of CPU 1 from the sleep mode.

That is, as long as the time interval from t1 to t8 is used as the coordinate detecting period ($T_S$) and the stylus is kept pressed against the cell, the coordinate detecting voltage $V_{CC}$ is applied to either of X- and Y-coordinate resistor plates 2 and 3 once in the coordinate detecting period ($T_S$). No current flows in either of the resistor plates during the rest time $T_R$ (FIG. 3(a)) of 8.6 to 9.0 msec which is the difference between the coordinate detecting period ($T_S$) (10 msec) and the sum of the periods $T_X$ and $T_Y$ (1.0 to 1.4 msec) for the application of the coordinate detecting voltage $V_{CC}$.

The coordinate detecting period $T_S$ can be freely set, but by setting it equal to or shorter than the data output period $T_D$ (FIG. 3(d)) for outputting data to a personal computer or host processor (not shown), the coordinate detected data can be provided for each data output period $T_D$.

In this embodiment, which is assumed to output the XY coordinate detected data to the host processor 100 times per second, the data output period $T_D$ is set at 10 msec and the coordinate detecting period $T_S$ is equal to the data output period $T_D$. Hence, for each data output period $T_D$ the XY coordinate data detected in that period is output via the output means of CPU 1 to a personal computer or similar host processor (not shown).

When the data output period $T_D$ is at least twice as long as the coordinate detecting period $T_S$, data for the XY coordinates detected in the respective individual periods $T_S$, which was obtained in the immediately preceding period $T_S$, except for abnormal values, is output by the output means of CPU 1.

This data output is repeatedly performed as long as stylus pressure detection continues after the CPU 1 has detected stylus pressure and left the sleep mode. If the stylus pressure is detected again after time t8, the processing from time t1 to t7 is repeated for the coordinate detection.

In the event that no stylus pressure is detected even after the stylus pressure detection is repeated a predetermined number of times, it is judged that the cell manipulation has been discontinued. CPU 1 goes into a waiting state at time t0 and remains in the sleep mode until time t1.

As described above, in this embodiment, effective XY coordinates are detected within the coordinate detecting period $T_S$, which is immediately followed by stopping the application of the coordinate detecting voltage $V_{CC}$ to the resistor plate concerned. Consequently, unlike in the conventional pressure sensitive resistor cell of the type alternately applying the coordinate detecting voltage $V_{CC}$ to the X and Y resistor plates, there is provided the rest time $T_R$ during which no potential gradient is formed in either resistor plate. Thus, rather than excessive power consumption as in the prior art, power is saved.

In this embodiment, since the rest time $T_R$ in the coordinate detecting period $T_S$ is long, the stylus pressure is detected before and after the coordinate detecting mode and the removal of the stylus pressure is detected in the coordinate detecting mode. However, the stylus pressure need not always be detected after the coordinate detecting mode.

While the embodiment has been described to make the primary detection of the stylus pressure being applied to the one resistor plate at a time when the potential from the stylus pressure goes below the threshold value, it is also possible to employ a configuration in which a detecting resistor is interposed between the other resistor plate and the ground when the stylus pressure is detected. Then, the potential at the resistor side connected to the detecting resistor is compared with the threshold value and the primary detection of the stylus pressure being applied is when the potential from the stylus pressure exceeds the threshold value.

Although in the above CPU 1 has been described to have a built-in logic circuit, the logic circuit may also be provided separately of CPU 1 as long as the potential at the input terminal of the logic circuit can be compared with the threshold value.

Furthermore, in the above embodiment, when the coordinate value converted to digital form by the A/D converter does not take the same value eight times in succession, the coordinate values calculated until then are regarded as being invalid. It is also possible to preset the number of calculations by the calculating means to one or more and output a selected one of the XY coordinate detected data thus obtained. Alternatively, the coordinate calculation may be continued during the coordinate detecting period $T_S$ as long as the coordinate calculated each time does not match the immediately preceding one.

Thus, the period necessary for the calculation of the coordinate is the period for which the coordinate calculation is repeated until the same coordinate is obtained in succession, or the period for which the coordinate calculation is repeated a predetermined number of times when the same coordinate is not obtained in succession.

As will be appreciated from the above, the invention has the following advantages.

According to the first embodiment of the invention, since in the waiting state the primary detection of the stylus pressure by the logic circuit is followed by starting the A/D converter for comparing the potential at its input terminal with the stylus pressure detecting threshold value, the A/D converter remains in the OFF state and hence does not dissipate power until the primary detection of the stylus pressure is made. Moreover, the secondary detection of the stylus pressure is made by the A/D converter. Consequently, when CPU goes into the coordinate detecting mode, contact resistance r due to stylus pressure is so low as not to affect the coordinate detection.

According to the second embodiment of the invention, since the logic circuit of the first embodiment is used also as a detector circuit for starting the CPU to leave the sleep mode, there is no need to separately provide a detector circuit for releasing the CPU from the sleep mode. Furthermore, since in the waiting state all the circuits of the CPU, except the stylus pressure detecting mode setting means and the logic circuit, are held OFF, power is saved, rather than consumed as in the prior art.

According to the third embodiment of the invention, since in the coordinate detecting mode the coordinate detection is free from the influence of the contact resistance, an effective coordinate can be detected by repeating the coordinate calculation a limited number of times within the data output period. Accordingly, once both X and Y coordinates are detected by performing coordinate calculation a predetermined number of times in the data output period, the potential gradient is no longer produced in either of the resistor plates. Thus, no current flows therein. Hence, power consumption can be cut accordingly.

According to the fourth embodiment of the invention, during the rest time $T_R$ after the calculation of both X and Y coordinates in the data output period, no potential gradient is formed in either of the resistor plates. That is, since no power is consumed by the resistor plates during the period $T_R$, the power consumption of the entire cell structure is decreased.

According to the fifth embodiment of the invention, once both X and Y coordinates of the pressed point are detected, no coordinate detecting voltage is fed to either resistor plate during the rest time $T_R$ in the coordinate detecting period $T_S$. Hence, no power is consumed by the resistor plates and the power dissipation by the entire cell is decreased accordingly.

It will be apparent to a person of ordinary skill in the art from reading the application that many modifications and variations may be effected without departing from the spirit and scope of the invention. All such modifications and alternative arrangements are intended to be within the spirit and scope of the appended claims.

What is claimed is:

1. A pressure sensitive resistor cell, comprising:

a pair of opposed X- and Y-coordinate resistor plates having an insulating gap defined therebetween, each of said pair of resistor plates including electrodes, the electrodes of each of said pair of resistor plates includes a voltage input electrode and a grounding electrode;

detecting voltage input means, which in a coordinate detecting mode of the cell applies a coordinate detecting voltage alternately to the voltage input electrode of either one of said pair of resistor plates and also grounds the grounding electrode of said either one of said pair of resistor plates, to generate a potential gradient in a surface of said either one of said pair of resistor plates;

an A/D converter having an input terminal that is alternately connected to an electrode of one or the other of said pair of resistor plates;

calculating means which receives a potential at a pressed point on a first one of said pair of resistor plates to which the coordinate detecting voltage is applied, via said A/D converter when the input terminal of said A/D converter is connected to an electrode of a second one of said pair of resistor plates and which calculates the coordinates of the pressed point from the potential input via said second one of said pair of resistor plates and said A/D converter, wherein said detecting voltage input means applies the coordinate detecting voltage to the first one of said pair of resistor plates to generate therein a first potential gradient only during a fixed period of time necessary for the calculation of both of the X and Y coordinates of the pressed point in said fixed periods;

stylus pressure detecting mode setting means for selecting a waiting state of the cell, said stylus pressure detecting mode setting means increasing the potential of the first one of said pair of resistor plates to a stylus pressure detecting voltage level and decreasing the potential of the second one of said pair of resistor plates to ground level; and stylus pressure detecting means for judging that said first one of said pair of resistor plates is being pressed and changing the state of the cell from the waiting state to the coordinate detecting mode, when the potential at said input terminal of said A/D converter exceeds a stylus pressure detecting threshold value, said stylus pressure detecting means including a logic circuit having means for comparing an electrode voltage of the electrode connected to the input terminal of said A/D converter and a threshold voltage;

wherein when an electrode of the first one of the pair of resistor plates is connected to the terminal of the A/D converter, the voltage of the first one of the pair of the resistor plates varies with the stylus pressure applied thereto, and when the voltage of the electrode of the first one of the pair of resistor plates connected to the input terminal of the A/D converter exceeds the threshold voltage, then said stylus pressure detecting means makes a primary detection that said first one of said pair of resistor plates is being pressed at a pressed point, said A/D converter starts and the potential at said input terminal is compared with the stylus pressure detecting threshold value; and wherein said A/D converter, said stylus pressure detecting mode setting means, said stylus pressure detecting means and said logic circuit are built in a one-chip CPU, and wherein while the cell is in the waiting state, said CPU is in a sleep mode such that all circuits of said CPU, except for said stylus pressure detecting mode setting means and said logic circuit, are in an OFF-state, and wherein when the electrode voltage varies due to the stylus pressure and exceeds the threshold value of said logic circuit, said CPU leaves the sleep mode so as to turn ON all of its circuits;

further comprising switching means which, after the calculation of one of the coordinates of the pressed point, switches between said pair of resistor plates for the generation of a second potential gradient in said second one of said pair of resistor plates by said detecting voltage input means and for the connection with the input terminal of said A/D converter, respectively; and still further comprising output means which outputs as XY coordinate data, for each fixed period, both X and Y coordinates of the pressed point calculated by said calculating means.

2. The pressure sensitive cell of claim 1, wherein said detecting voltage input means begins applying the coordinate detecting voltage to said first one of said pair of resistor plates to generate therein the first potential gradient in a coordinate detecting period no longer than the fixed period;

wherein after the calculation of one of the coordinates of the pressed point by said calculating means, said detecting voltage input means applies the coordinate detecting voltage to the other resistor plate via said switching means to generate in said other resistor plate the second potential gradient; and wherein after the calculation of both coordinates of the pressed point, said detecting voltage input means applies no coordinate detecting voltage to either of said pair of resistor plates in the coordinate detecting period.

3. A pressure sensitive resistor cell, comprising:

a pair of opposed X- and Y-coordinate resistor plates having an insulating gap defined therebetween, each of said pair of resistor plates including electrodes, the electrodes of each of said pair of resistor plates including a voltage input electrode and a grounding electrode;

detecting voltage input means, which in a coordinate detecting mode of the cell applies a coordinate detecting voltage alternately to the voltage input electrode of either one of said pair of resistor plates and also grounds the grounding electrode of said either one of said pair of resistor plates, to generate a potential gradient in a surface of said either one of said pair of resistor plates;

an A/D converter having an input terminal that is alternately connected to an electrode of one or the other of said pair of resistor plates;

calculating means which receives a potential at a pressed point on a first one of said pair of resistor plates to which the coordinate detecting voltage is applied, via said A/D converter when the input terminal of said A/D converter is connected to an electrode of a second one of said pair of resistor plates and which calculates the coordinates of the pressed point from the potential input via said second one of said pair of resistor plates and said A/D converter, wherein said detecting voltage input means applies the coordinate detecting voltage to the first one of said pair of resistor plates to generate therein a first potential gradient only during a fixed period of time necessary for the calculation of both of the X and Y coordinates of the presented point in said fixed period;

stylus pressure detecting mode setting means for selecting a waiting state of the cell, said stylus pressure detecting mode setting means increasing the potential of said first one of said pair of resistor plates to a stylus pressure detecting voltage level and decreasing the potential of the second one of said pair of resistor plates to ground level; and stylus pressure detecting means for judging that said first one of said pair of resistor plates is being pressed and changing the state of the cell from the waiting state to the coordinate detecting mode, when the potential at said input terminal of said A/D converter exceeds a stylus pressure detecting threshold value, said stylus pressure detecting means including a logic circuit having means for comparing an electrode voltage of the electrode connected to the input terminal of said A/D converter and a threshold voltage; and wherein when an electrode of the first one of the pair of resistor plates is connected to the input terminal of the A/D converter, the voltage of the first one of the pair of the resistor plates varies with the stylus pressure applied thereto, and when the voltage of the electrode of the first one of the pair of resistor plates connected to the input terminal of the A/D converter exceeds the threshold voltage, then said stylus pressure detecting means makes a primary detection that said first one of said pair of resistor plates is being pressed at a pressed point, said A/D converter starts and the potential at said input terminal is compared with the stylus pressure detecting threshold value;

further comprising switching means which, after the calculation of one of the coordinates of the pressed point, switches between said pair of resistor plates for the generation of a second potential gradient in said second one of said pair of resistor plates by said detecting voltage input means and for the connection with the input terminal of said A/D converter, respectively; and still further comprising output means which outputs as XY coordinate data, for each fixed period of time, both X and Y coordinates of the pressed point calculated by said calculating means.

4. The pressure sensitive cell of claim 3, wherein said detecting voltage input means begins applying the coordinate detecting voltage to said first one of said pair of resistor plates to generate therein the first potential gradient in a coordinate detecting period no longer than the fixed period;

wherein after the calculation of one of the coordinates of the pressed point by said calculating means, said detecting voltage input means applies the coordinate detecting voltage to the other resistor plate via said switching means to generate in said other resistor plate the second potential gradient; and wherein after the calculation of both coordinates of the pressed point, said detecting voltage input means applies no coordinate detecting voltage to either of said pair of resistor plates in the coordinate detecting period.

5. A pressure sensitive resistor cell comprising:

a pair of opposed X- and Y-coordinate resistor plates having an insulating gap defined therebetween, each of said pair of resistor plates having a voltage input electrode and a grounding electrode;

detecting voltage input means for applying a coordinate detecting voltage to the voltage input electrode of one of said pair of resistor plates and, at the same time, grounding the grounding electrode of said one of said pair of resistor plates, to generate a first potential gradient in a surface of said one of said pair of resistor plates;

an A/D converter having an input terminal connected to one of the electrodes of the other resistor plate, wherein, with the first potential gradient being generated in said surface, said A/D converter receives a potential at a pressed point on said one of said pair of resistor plates;

calculating means for calculating the coordinates of the pressed point from the potential received by said A/D converter;

switching means, which after the calculation of one coordinate of the pressed point, switches connections of said pair of resistor plates as between said detecting voltage input means and the input terminal of said A/D converter; and output means for outputting as XY coordinate data, for each fixed period, both X and Y coordinates of the pressed point calculated by said calculating means;

wherein only during a period necessary for the calculation of both of the X and Y coordinates of the pressed point in the fixed period, said detecting voltage input means applies the coordinate detecting voltage to a corresponding one of said pair of resistor plates to generate therein the first potential gradient.

6. The pressure sensitive cell of claim 5, wherein said detecting voltage input means begins applying the coordinate detecting voltage to said one of said pair of resistor plates to generate therein the first potential gradient in a coordinate detecting period no longer than the fixed period;

wherein after the calculation of one of the coordinates of the pressed point by said calculating means, said detecting voltage input means applies the coordinate detecting voltage to the other resistor plate via said switching means to generate in said other resistor plate a second potential gradient; and wherein after the calculation of both coordinates of the pressed point, said detecting voltage input means applies no coordinate detecting voltage to either of said pair of resistor plates in the coordinate detecting period.

7. A pressure sensitive resistor cell, comprising:

a pair of opposed X- and Y-coordinate resistor plates having an insulating gap defined therebetween, each of said pair of resistor plates including electrodes, the electrodes of each of said pair of resistor plates including a voltage input electrode and a grounding electrode;

detecting voltage input means, which in a coordinate detecting mode of the cell applies a coordinate detecting voltage alternately to the voltage input electrode of either one of said pair of resistor plates and also grounds the grounding electrode of said either one of said pair of resistor plates, to generate a potential gradient in a surface of said either one of said pair of resistor plates; and calculating means which receives a potential at a pressed point on which resistor plates to which the coordinate detecting voltage is applied, and which calculates the coordinates of the pressed point from the potential, wherein only during a fixed period of time necessary for the calculation of both of the X and Y coordinates of the present point in said fixed period, said detecting voltage input means applies the coordinate detecting voltage to the resistor plate to which the coordinate detecting voltage is applied to generate therein a potential gradient.

* * * * *